United States Patent [19]

Bonko et al.

[11] Patent Number: 4,534,392
[45] Date of Patent: Aug. 13, 1985

[54] TRACTOR TIRE

[75] Inventors: Mark L. Bonko, Hartville; Loran C. Lopp, Jr., Wadsworth, both of Ohio

[73] Assignee: The Goodyear Tire & Rubber Company, Akron, Ohio

[21] Appl. No.: 610,914

[22] Filed: May 16, 1984

[51] Int. Cl.³ .............................................. B60C 11/00
[52] U.S. Cl. ................................................ 152/209 B
[58] Field of Search ........... 152/209 B, 209 D, 209 R; D12/136, 140

[56] References Cited

U.S. PATENT DOCUMENTS

| | | | |
|---|---|---|---|
| 2,011,552 | 8/1935 | Hoover | 152/209 B |
| 2,113,066 | 4/1968 | Hoover | 152/209 B |
| 2,415,290 | 2/1947 | Kreyer | 152/209 B |
| 2,415,291 | 2/1947 | Kreyer | 152/209 B |
| 3,603,370 | 9/1971 | Hylbert | 152/209 B |
| 4,383,567 | 3/1983 | Crum et al. | 152/209 B |
| 4,480,672 | 11/1984 | Marshall et al. | 152/209 B |

Primary Examiner—Michael Ball
Attorney, Agent, or Firm—L. R. Drayer

[57] ABSTRACT

A tire for tractors and like vehicles has a tread with three sets of lugs extending axially inwardly from each lateral edge of the tread. The lugs of each of the sets extend across the tread a different distance as compared to the lugs of each of the other sets of lugs. Each lug has two portions, with the portions oriented at different angles with respect to the mid-circumferential plane of the tire.

11 Claims, 4 Drawing Figures

TRACTOR TIRE

BACKGROUND OF THE INVENTION

This invention relates to pneumatic tractor tires for use on farm tractors and like vehicles.

It is widely recognized in the tire designing technology that a change in the tread structure of a tractor tire that results in improved draw bar traction over a prior art tire under one set of soil conditions will not necessarily be better, or even equal, under a much different set of soil conditions also. It is also widely recognized that tread design features that are aimed at providing improved draw bar characteristics for a tractor operated in a field may very likely result in less than desirable ride vibration characteristics when the same tractor tire is operated on a paved roadway, and vice versa.

A tractor tire in accordance with the present invention has exhibited draw bar traction that is substantially equal to, or better than, a prior art tractor tire that has been recognized in the tire industry for having exceptionally good draw bar traction characteristics, while exhibiting acceptable ride vibration characteristics in both on and off the road operation.

BRIEF DESCRIPTION OF THE DRAWINGS

The features of the present invention which are believed to be novel are set forth with particularity in the appended claims. The present invention, both as to its structure and manner of operation, may best be understood by reference to the following detailed description, taken in accordance with the accompanying drawings in which:

DETAILED DESCRIPTION OF THE INVENTION

Figure 4:
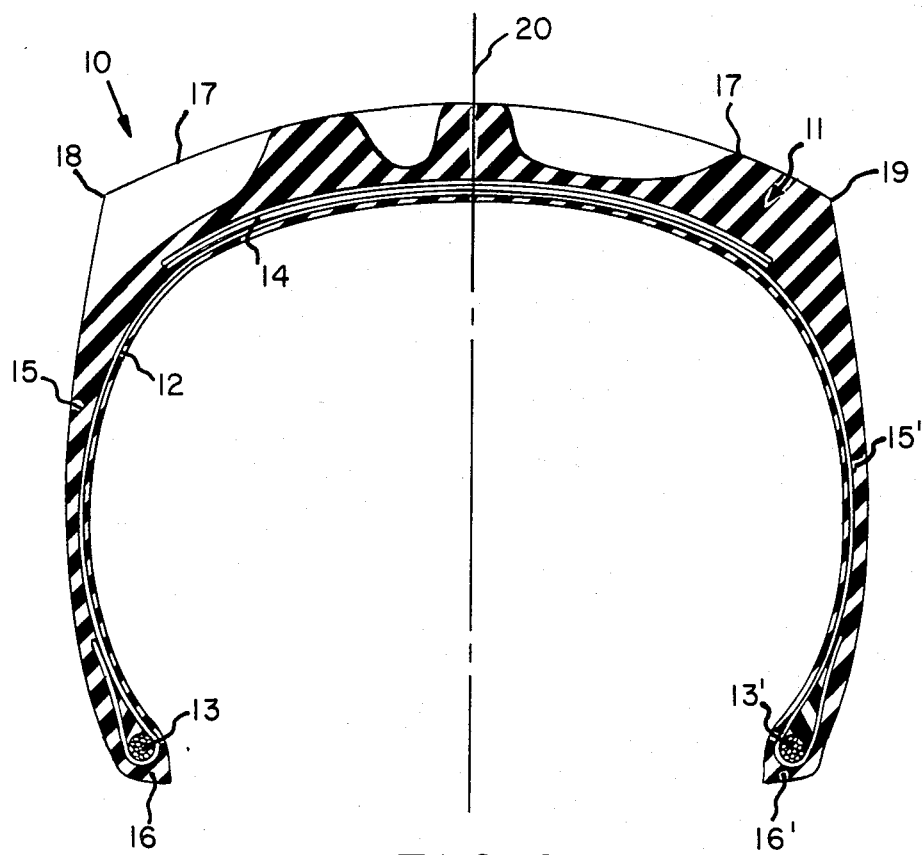
FIG. 4 is a radial cross-sectional view of the tractor tire shown in FIG. 1, taken substantially along line 4—4 of FIG. 3.

Referring first to FIG. 4, there is shown a radial cross-sectional view of a pneumatic tractor tire 10 manufactured in accordance with the preferred embodiment of the invention. A pneumatic tractor tire comprises a tread portion 11 extending circumferentially around the axis of rotation of the tire. The tread portion comprises an elastomeric substance such as natural or synthetic rubber. As used herein, "radial" and "radially" refer to directions perpendicular to the axis of rotation of a tire, and "axial" and "axially" refer to directions parallel to the axis of rotation of a tire. A carcass reinforcing structure 12, comprising one or more plies of reinforcing elements, such as textile or metallic filaments or cables, extends about the tire radially inwardly of the tread portion. The carcass reinforcing structure is anchored around a pair of substantially inextensible annular beads 13,13'. While the carcass reinforcing structure 12 illustrated in the preferred embodiment is of the type commonly referred to in the tire art as a radial ply construction, it is understood that a pneumatic tractor tire according to the invention could have a carcass reinforcing structure of the type that is commonly referred to as a bias ply construction. A tread reinforcement structure 14, comprising what are commonly referred to as belts, extends circumferentially about the tire between the carcass reinforcing structure and the tread portion. Sidewalls 15,15' extend generally radially inwardly from the tread portion to the bead portions 16,16'.

The tread portion 11 comprises several sets of high lugs, generally designated in FIG. 4 by reference character 17, which have their beginnings at the first 18 and second 19 lateral edges of the tread, with valleys located between the lugs. A tire according to the invention has a mid-circumferential centerplane 20. As used herein a "mid-circumferential centerplane" is a plane which is perpendicular to the axis of rotation of a tire, located midway between the lateral edges of the tread in the footprint of a tire that has been mounted on its designated rim, then inflated to its design inflation pressure and subjected to its rated load. As used herein "axially inwardly" is understood to mean an axial direction going from a lateral edge of the tread towards the mid-circumferential centerplane, and "axially outwardly" is understood to mean an axial direction going from the mid-circumferential centerplane towards a lateral edge of the tread.

Figure 1:
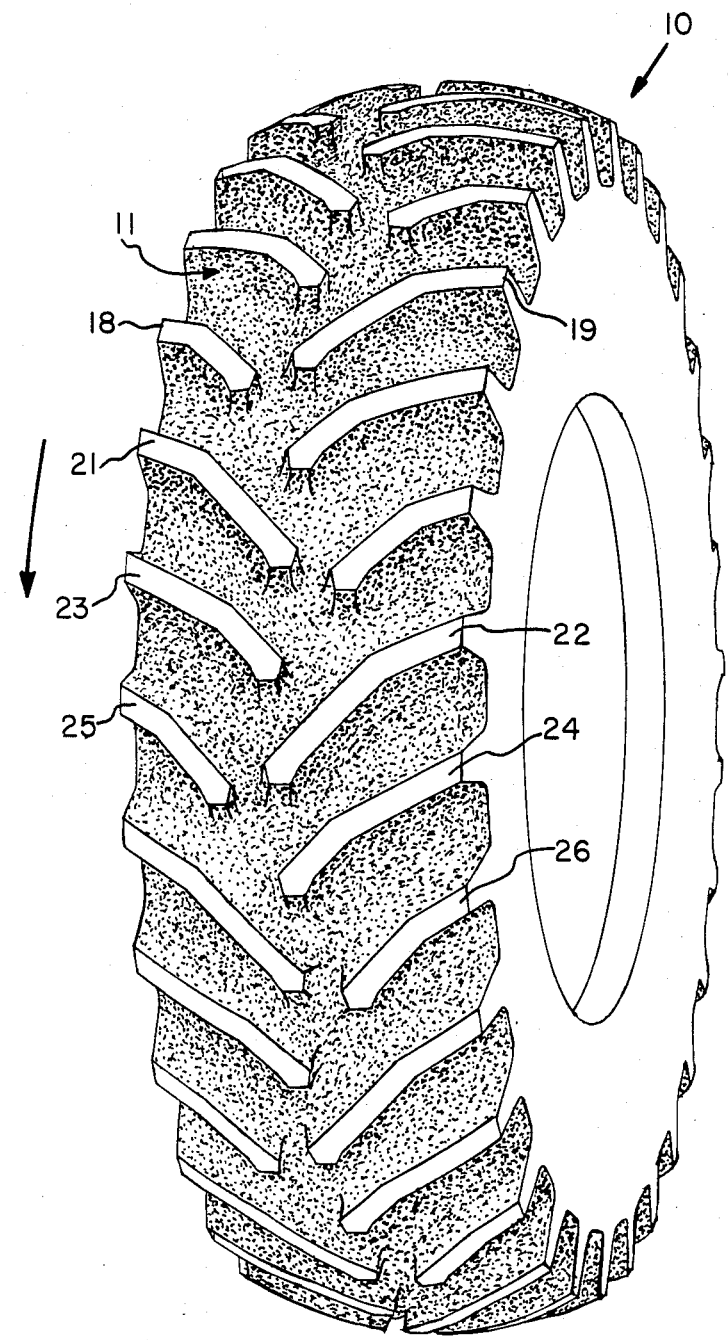
FIG. 1 is a perspective view of a tractor tire in accordance with the preferred embodiment of the invention.
Figure 2:
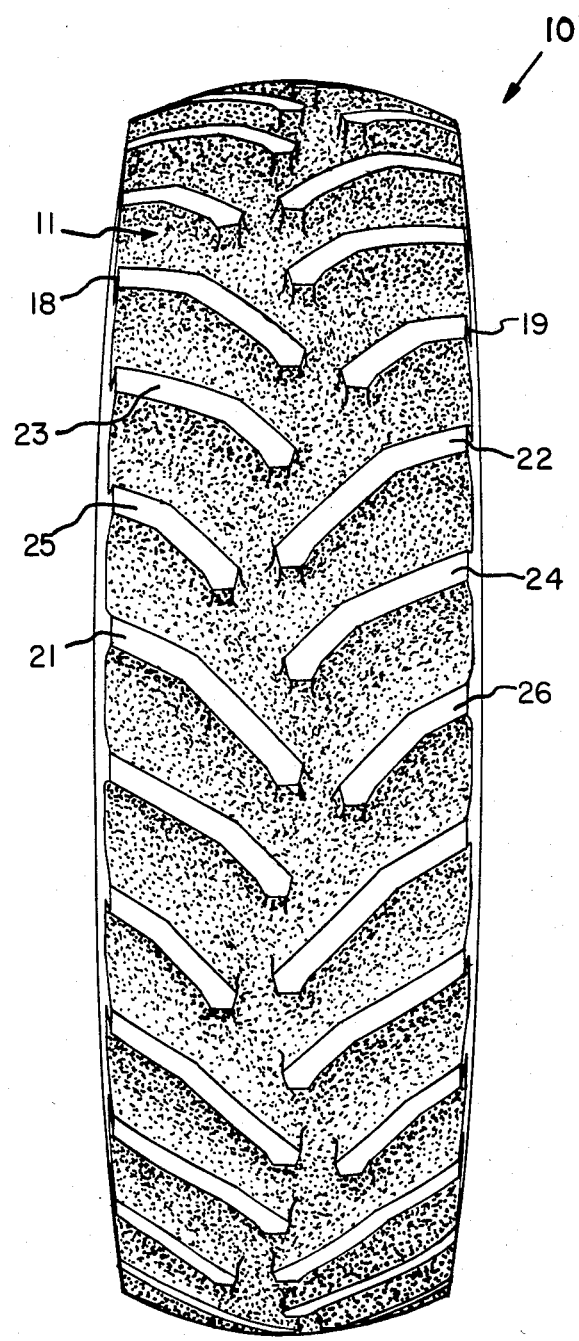
FIG. 2 is a front elevation view of the tractor tire shown in FIG. 1.
Figure 3:
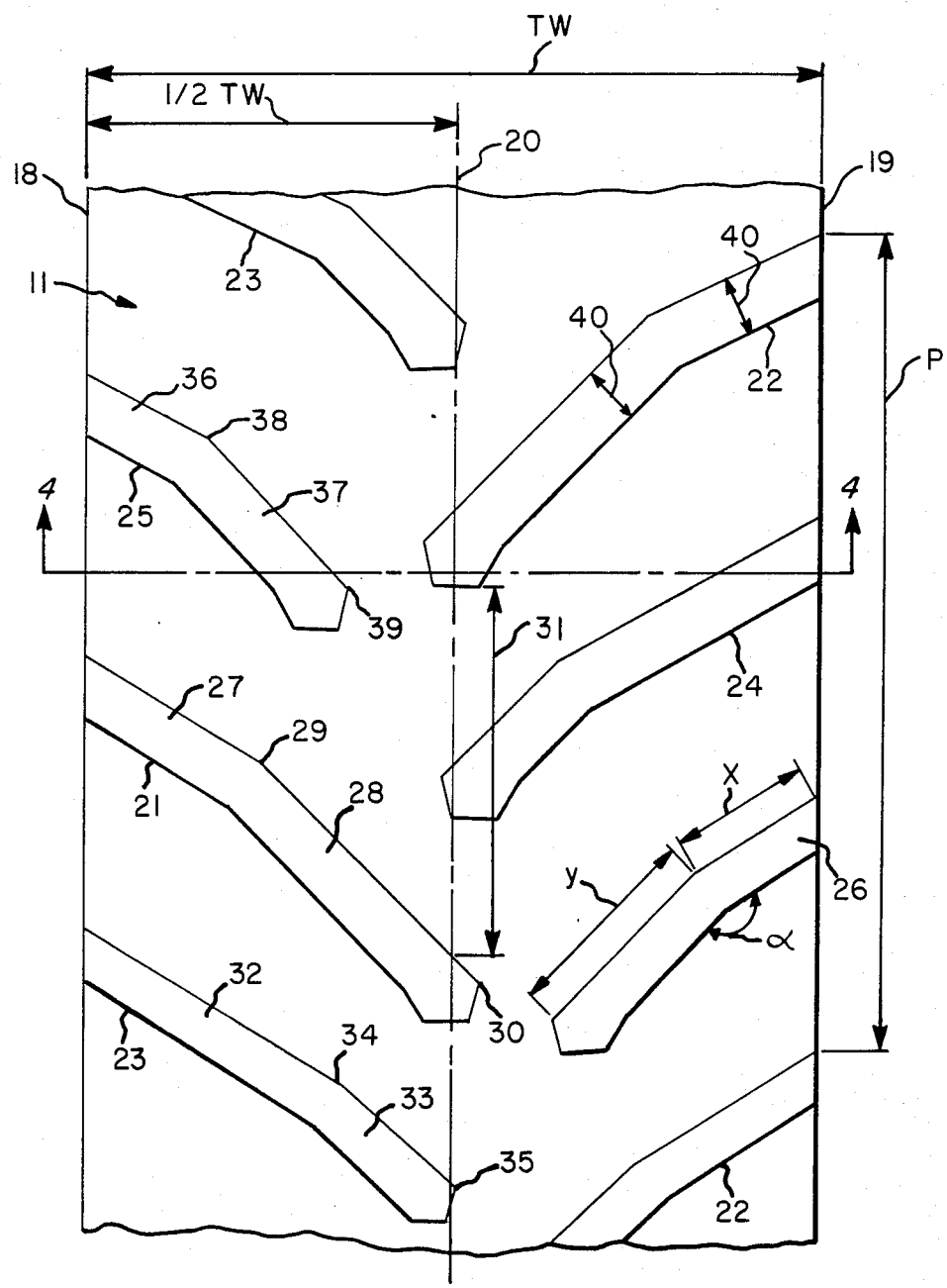
FIG. 3 is an enlarged plan view of a portion of the tread of the tractor tire shown in FIG. 1.

Referring now to FIGS. 1, 2 and 3 in unison a pneumatic tractor tire according to the invention will be described in greater detail. It should be noted that the tire of this invention has a directional tread, and that there is a normal or preferred direction of rotation of the tire for best overall performance as indicated by the arrow in FIG. 1. For the purpose of describing this invention, "leading" shall mean a portion or part of the tread that contacts the ground first, with respect to a series of such parts or portions, during normal rotation of the tire in the preferred direction; and, "lagging" shall mean that portion or part of the tread that contacts the ground last, with respect to a series of such parts or portions. As used herein, the axial distance between the first 18 and second 19 lateral edges of the tread, measured when a tire is subjected to rated load and inflation pressure while mounted upon the designated rim is the tread width TW.

The tread portion 11 of the pneumatic tire of this invention comprises: two sets of primary lugs 21,22 which are the longest lugs, two sets of secondary lugs 23,24 which are the medium length lugs, and two sets of tertiary lugs 25,26 which are the shortest lugs.

It is understood that for the purpose of interpretation of the specification and claims all angles and distances refer to the footprint of a newly molded tire that has been mounted upon a specified rim and inflated to the specified inflation pressure and subjected to rated load.

Each lug 21 of the first set of primary lugs has first 27 and second 28 portions. The first portion 27 begins at the first lateral edge of the tread 18 and extends to an axially inner end 29 located between 40 and 60 percent (more preferably between 45 and 55 percent, and most preferably between 49 to 51 percent) of the axial distance $\frac{1}{2}$ TW from the first lateral edge of the tread to the mid-circumferential centerplane 20 of the tire at an angle of between 59 and 69 degrees (more preferably between 62 and 66 degrees, most preferably between $63\frac{1}{2}$ and $64\frac{1}{2}$ degrees) with respect to said mid-circumferential centerplane. The second portion 28 of a primary lug extends from the axially inner end 29 of the first portion to an axially inner end 30 located between 96 and 112 percent (more preferably between 104 and 112 percent, and most preferably between 107 and 109 percent) of the axial distance ½ TW from the first lateral edge of the tread 18 to the mid-circumferential centerplane 20 at an angle of between 38 to 50 degrees (more preferably between 42 to 47 degrees, most preferably between 44 to 46 degrees) with respect to the mid-circumferential centerplane. It is understood that the axially inner end of any portion of any lug of the tread is that point on that portion of a lug which is located at the greatest axial distance from the axial edge of the tread at which that particular lug originates. Of course any location that is greater than 100 percent of the axial distance ½ TW from one lateral edge of the tread to the mid-circumferential centerplane is actually between the opposite lateral edge of the tread and the mid-circumferential centerplane. In the preferred embodiment illustrated in the drawings, all of the angles and distances are in the most preferred ranges designated for each component of the tread.

Each lug 22 of the second set of primary lugs is similar to the lugs of the first set of primary lugs but opposite in hand, having a beginning at the second lateral edge 19 of the tread and being offset circumferentially of said first tire with the next adjacent pair of primary lugs in said first set of primary lugs so that the leading edge of every primary lug 21,22 of each set is spaced a distance of between 40 to 60 percent (more preferably between 45 to 55 percent, and most preferably between 45 to 47 percent) of the tread width TW from the lagging edge of a lug of the other set of primary lugs as measured on the mid-circumferential centerplane at 31. The circumferential spacing between the primary lugs is important because it assures maintaining adequate spacing between the lugs at the mid-circumferential centerplane so that soil removal from the tread will be efficient while maintaining a substantially uniform ride vibration pattern as the tire rotates through its footprint. In this repeating type of tread pattern the spacing between the lugs is also a function of the pitch length P, which is an arc of the tread that contains one entire lug from each of the sets of lugs. It is necessary that a whole number of pitches be located around the circumference of the tread, so the spacing between the lugs will vary between tires having various diameters at their mid-circumferential centerplanes to meet this design parameter.

Each lug 23 of the first set of secondary lugs has first 32 and second 33 portions. The first portion 32 begins at the first lateral edge 18 of the tread and extends to an axially inner end 34 located between 62 and 82 percent (more preferably between 67 and 77 percent, and most preferably between 71 and 73 percent) of the axial distance ½ TW from the first lateral edge 18 of the tread to the mid-circumferential centerplane 20 at an angle of between 59 and 69 degrees (more preferably between 62 and 66 degrees, most preferably between 63½ and 64½ degrees) with respect to said mid-circumferential centerplane. The second portion 33 of a secondary lug extends from the axially inner end 34 of the first portion to an axially inner end 35 located between 96 and 112 percent (more preferably 100 and 106 percent, and most preferably between 101 and 104 percent) of the axial distance ½ TW from the first lateral edge 18 of the tread to the mid-circumferential centerplane 20 at an angle of between 38 and 50 degrees (more preferably between 42 and 47 degrees, and most preferably between 44 and 46 degrees) with respect to the mid-circumferential centerplane. Only one of said secondary lugs 23 is disposed between each pair of next adjacent lugs 21 of the first set of primary lugs.

Each lug 24 of the second set of secondary lugs is similar to the lugs 23 of the first set of secondary lugs, but opposite in hand, having a beginning at the second lateral edge 19 of the tread. Only one of the lugs 24 of the second set of secondary lugs is disposed between each pair of next adjacent lugs 22 of the second set of primary lugs. The primary lugs 21,22 and secondary lugs 23,24 form an interlocking pattern that is believed to contribute to the good ride vibration characterics of the tire.

Each lug 25 of the first set of tertiary lugs has first 36 and second 37 portions. The first portion 36 begins at the first lateral edge 18 of the tread and extends to an axially inner end 38 located between 24 and 44 percent (more preferably between 29 and 39 percent, most preferably between 33 and 35 percent) of the axial distance ½ TW from said first lateral edge 18 of the tread to the mid-circumferential centerplane 20 at an angle of between 59 and 69 degrees (more preferably between 62 and 66 degrees, most preferably between 63½ and 64½ degrees) with respect to said mid-circumferential centerplane. The second portion 37 of a tertiary lug extends from the axially inner end 38 of the first portion to an axially inner end 39 located between 63 and 83 percent (more preferably between 68 and 78 percent, most preferably between 70 and 75 percent) of the axial distance ½ TW from the first lateral edge of the tread to the mid-circumferential centerplane at an angle of between 38 and 50 degrees (more preferably between 42 and 47 degrees, and most preferably between 44 and 46 degrees) with respect to the mid-circumferential centerplane. Only one of said tertiary lugs 25 is disposed between each pair of next adjacent primary lugs 21 of the first set of primary lugs. The location of the axially inner ends of the second portions of the tertiary lugs is believed to be important because if they are too close to the mid-circumferential centerplane the tertiary lugs will impede soil removal. A further advantage of these shorter tertiary lugs is believed to be that they contribute to better ride vibration characteristics without crowding the interlocking pattern of the primary and secondary lugs at the mid-circumferential centerplane.

Each lug 26 of the second set of tertiary lugs is similar to the lugs 25 of the first set of tertiary lugs, but opposite in hand, and has a beginning at the second lateral edge 19 of the tread. Only one of the lugs 26 of the second set of tertiary lugs is disposed between each pair of next adjacent lugs 22 of the second set of primary lugs.

Preferably, as illustrated in the preferred embodiment shown in figures of the drawing, each tertiary lug 25,26 has a beginning at the respective lateral edge 18,19 of the tread that is disposed between a trailing edge of a primary lug 21,22 and a leading edge of a secondary lug 23,24, to most advantageously contribute to the good ride vibration characteristics of the tire.

It is also preferred, as illustrated in the figures of the drawing, that the first portion of each primary 21,22, secondary 23,24, and tertiary 25,26 lug have its beginning located substantially midway between the beginnings of the first portions of the circumferentially next adjacent leading and lagging lugs of the other sets of lugs having beginnings at the same lateral edge of the tread. It is believed that this uniform spacing will contribute to efficient soil removal from the tread as well as improved ride vibration characteristics. Of course, efficient soil removal contributes to improved traction.

It has been found that a pneumatic tractor tire in accordance with the invention, as it has already been described in the foregoing paragraphs, may be fine tuned to a most preferred embodiment by establishing certain ratios for the lengths of the first and second portions of every lug. This feature of the invention will be described with reference to a tertiary lug 26 located on the right hand side of the tread 11 as illustrated in FIG. 3. While only a tertiary lug will be used for illustrating this feature of the invention, its application to primary and secondary lugs will also be pointed out. It is believed that in a most preferred embodiment the angle $\alpha$ that is included between the leading edges of the first and second portions of each primary, secondary, and tertiary lug should be between 156 and 166 degrees, and most preferably between 160 and 162 degrees. Furthermore, it is preferred that the ratio of the length of the first portion of a lug, as measured along the lagging edge of a lug at x, to the length of a second portion of a lug, as measured along the lagging edge of a lug at y, (that is to say x/y) should be between 0.587 and 0.787 (most preferably 0.687) for each primary lug; between 1.792 and 1.992 (most preferably 1.892) for each secondary lug; and between 0.611 and 0.811 (most preferably 0.711) for each tertiary lug. It is understood that the exact included angles and ratios will depend upon the size of the tire and the number of pitches around the circumference of the tread, but by using this fine tuning factor both the appearance and operating characteristics of various size tires according to the invention may be made more uniform.

It is preferable to have the angular orientation of the first portion of each primary, secondary, and tertiary lug with respect to the mid-circumferential centerplane be the same for every lug of the tread, as is illustrated in the drawings. Furthermore, it is preferable to have the angular orientation of the second portion of each primary, secondary, and tertiary lug with respect to the mid-circumferential centerplane be the same for every lug of the tread, as is illustrated in the drawings. If the variance in these angles from one lug to the circumferentially next adjacent lugs is too great there will be variations (necking down) of the widths of the soil removal passageways between lugs that could impede both soil removal and traction.

It is preferred, but not absolutely necessary, that the radially outer surface, that is the surface which will be in direct contact with the ground, of each primary, secondary and tertiary lug of a newly molded tire should have the same width, as measured in directions perpendicular to the leading and lagging edges of said lugs at 40 in FIG. 3. This uniformity of lug width provides both a more pleasing appearance and more uniform performance as the tire rotates through its footprint.

The axially inner end of the second portion of each primary, secondary and tertiary lug may be enlarged in ground-engaging area.

While certain representative embodiments and details have been shown and described for the purpose of illustrating the invention, it will be apparent to those skilled in the art that various changes and modifications may be made therein without departing from the spirit or scope of the invention.

What is claimed is:

1. A pneumatic tire for tractors and like vehicles wherein said tire has a mid-circumferential centerplane and a tread portion with first and second lateral edges, said tread portion comprising:

(a) two sets of primary lugs, each lug of said first set of primary lugs having first and second portions, said first portion beginning at the first lateral edge of the tread and extending to an axially inner end located between 40 and 60 percent of the axial distance from said first lateral edge of the tread to said mid-circumferential centerplane of the tire at an angle of between 59 and 69 degrees with respect to said mid-circumferential centerplane, said second portion extending from the axially inner end of said first portion to an axially inner end located between 96 and 112 percent of the axial distance from said first lateral edge of the tread to said mid-circumferential centerplane at an angle of between 38 and 50 degrees with respect to said mid-circumferential centerplane;

(i) each lug of a second set of primary lugs being similar to the lugs of said first set of primary lugs but opposite in hand, having a beginning at the second lateral edge of the tread and being offset circumferentially of said tire with respect to the next adjacent pair of primary lugs in said first set of primary lugs so that the leading edge of each said primary lug is spaced a distance of between 40 and 60 percent of the tread width from the lagging edge of a lug of said other set of primary lugs as measured on said mid-circumferential centerplane;

(b) two sets of secondary lugs, each lug of a first set of secondary lugs having first and second portions, said first portion beginning at said first lateral edge of the tread and extending to an axially inner end located between 62 and 82 percent of the axial distance from said first lateral edge of the tread to said mid-circumferential centerplane at an angle of between 59 and 69 degrees with respect to said mid-circumferential centerplane, said second portion extending from the axially inner end of said first portion to an axially inner end located between 96 and 112 percent of the axial distance from said first lateral edge of the tread to said mid-circumferential centerplane at an angle of between 38 and 50 degrees with respect to said mid-circumferential centerplane, and only one of said secondary lugs being disposed between each pair of next adjacent primary lugs of the first set of primary lugs;

(i) each lug of a second set of secondary lugs being similar to the lugs of said first set of secondary lugs but opposite in hand and having a beginning at the second lateral edge of the tread, only one of said secondary lugs being disposed between each pair of next adjacent primary lugs of the second set of primary lugs; and (c) two sets of tertiary lugs, each lug of a first set of tertiary lugs having first and second portions, said first portion beginning at said first lateral edge of the tread and extending to an axially inner end located between 24 and 44 percent of the axial distance from said first lateral edge of the tread to said mid-circumferential centerplane at an angle of between 59 and 69 degrees with respect to said mid-circumferential centerplane, said second portion extending from the axially inner end of said first portion to an axially inner end located between 63 and 83 percent of the axial distance from said first lateral edge of the tread to said mid-circumferential centerplane at an angle of between 38 and 50 degrees with respect to said mid-circumferential centerplane, only one of said tertiary lugs being disposed between each pair of next adjacent primary lugs of the first set of primary lugs;

(i) each lug of a second set of tertiary lugs being similar to the lugs of said first set of tertiary lugs but opposite in hand and having a beginning at the second lateral edge of the tread, only one of said tertiary lugs being disposed between each pair of next adjacent primary lugs of the second set of primary lugs.

2. A pneumatic tire as claimed in claim 1 wherein each of said lugs has a leading edge and a lagging edge, the ratio of the length of the first portion of a lug to the second portion of a lug, as measured along the lagging edge of a lug being: between 0.587 and 0.787 for each primary lug; between 1.792 and 1.992 for each secondary lug; and between 0.611 and 0.811 for each tertiary lug.

3. A pneumatic tire as claimed in claim 1 wherein the included angle between the leading edges of the first and second portions of each lug is between 156 to 166 degrees.

4. A pneumatic tire as claimed in claim 2 wherein the included angle between the leading edges of the first and second portions of each lug is between 156 to 166 degrees.

5. A pneumatic tire as claimed in any one of claims 1, 2, 3 or 4 wherein each tertiary lug has a beginning at the respective lateral edge of the tread that is disposed between a trailing edge of a primary lug and a leading edge of a secondary lug.

6. A pneumatic tire as claimed in any one of claims 1, 2, 3 or 4 wherein the first portion of each said primary, secondary and tertiary lug has its beginning located substantially midway between the beginnings of the first portions of the circumferentially next adjacent leading and lagging lugs of the other sets of lugs having beginnings at the same lateral edge of the tread.

7. A pneumatic tire as claimed in any one of claims 1, 2, 3 or 4 wherein each tertiary lug is disposed between a trailing edge of a primary lug and a leading edge of a secondary lug, and wherein the first portion of each said primary, secondary and tertiary lug has its beginning located substantially midway between the beginnings of the first portions of the circumferentially next adjacent leading and lagging lugs of the other sets of lugs having beginnings at the same lateral edge of the tread.

8. A pneumatic tire as claimed in any one of claims 1, 2, 3 or 4 wherein the axially inner end of the second portion of each of said primary, secondary and tertiary lugs is enlarged in ground-engaging area.

9. A pneumatic tire as claimed in any one of claims 1, 2, 3 or 4 wherein each of said primary, secondary and tertiary lugs has a radially outer surface, the radially outer surface of each of said lugs in a newly molded tire having the same width as measured in directions perpendicular to the leading and lagging edges of said lugs.

10. A pneumatic tire as claimed in claim 7 wherein each of said primary, secondary and tertiary lugs has a radially outer surface, the radially outer surfaces of each of said lugs in a newly molded tire having the same width as measured in directions perpendicular to the leading and lagging edges of said lugs, and the axially inner end of the second portion of each of said primary, secondary and tertiary lugs is enlarged in ground-engaging area.

11. A pneumatic tire as claimed in claim 10 wherein the axially inner end of the second portion of each of said primary, secondary and tertiary lugs is enlarged in ground-engaging area.

* * * * *